(12) United States Patent
Chung

(10) Patent No.: US 6,348,088 B2
(45) Date of Patent: Feb. 19, 2002

(54) SYSTEM AND METHOD FOR RECOVERING COOLING CAPACITY FROM A FACTORY EXHAUST GAS

(75) Inventor: Chin-Hsien Chung, Hsin Chu (TW)

(73) Assignee: Taiwan Semiconductor Manufacturing Company, Ltd, Hsin Chu (TW)

( * ) Notice: Subject to any disclaimer, the term of this patent is extended or adjusted under 35 U.S.C. 154(b) by 0 days.

(21) Appl. No.: 09/854,004

(22) Filed: May 11, 2001

Related U.S. Application Data

(63) Continuation-in-part of application No. 09/240,744, filed on Jan. 29, 1999, now abandoned.

(51) Int. Cl.[7] ............................................... B01D 47/00
(52) U.S. Cl. ............................................ 96/266; 95/227
(58) Field of Search .............................. 95/227; 96/266

*Primary Examiner*—Chester T. Barry
(74) *Attorney, Agent, or Firm*—Tung & Associates

(57) ABSTRACT

A system and a method for recovering energy from a low temperature factory exhaust gas are disclosed. In the system, a heat exchanger is added between a wet scrubber and a cooling tower such that a low temperature scrubber exhaust gas can be utilized to decrease the temperature of a heat transfer medium used in the cooling tower. The lower temperature cooling tower water therefore increases the efficiency of cooling in a chiller connected to the cooling tower. Furthermore, the increased scrubber exhaust gas temperature reduces its opacity to fulfill requirement of environmental protection regulations. The lower water temperature in the cooling tower further reduces water evaporation rate and therefore reduces water consumption due to evaporation.

27 Claims, 2 Drawing Sheets

SYSTEM AND METHOD FOR RECOVERING COOLING CAPACITY FROM A FACTORY EXHAUST GAS

RELATED APPLICATIONS

This is a continuation-in-part (CIP) application of U.S. patent application Ser. No. 09/240,744, filed Jan. 29, 1999, now abandoned.

FIELD OF THE INVENTION

The present invention generally relates to a system and a method for recovering cooling capacity from a factory exhaust gas and more particularly, relates to a system and a method for recovering cooling capacity from a low temperature factory exhaust gas by utilizing its cooling capacity to decrease the temperature of a heat transfer medium used in a cooling tower such that the temperature of the factory exhaust may be increased, the water evaporation in the cooling tower may be reduced and the opacity of the factory exhaust gas may be reduced.

BACKGROUND OF THE INVENTION

In various semiconductor fabrication processes, the effluent gases from a process chamber must be treated before they can be released into a factory exhaust system and into the atmosphere. It is known that a large number of reactant gases and their reaction products utilized in semiconductor fabrication processes are highly flammable or highly toxic. The spent reactant gases that are discharged out of the process chamber may contain gases that have not been reacted or have been only partially reacted and therefore must be treated before they can be released into the atmosphere.

In a semiconductor fabrication facility, the treatment of the exhaust gases generated from the facility is an important aspect of the total fabrication processes. Various exhaust gases are produced in a semiconductor fabrication facility, these include general exhaust, scrubbed exhaust and solvent exhaust. For discharging the general exhaust and the solvent exhaust, a system typically includes ductworks, exhaust fans, by-passes, and stacks can be used. For handling the scrubbed exhaust, a scrubber must be used for treating the exhaust before they can be released into the atmosphere. A by-pass system can be provided which allows the drawing of outside air when the pressure at the suction side of the blower exceeds a preset value.

In a general exhaust system, heat dissipated by the process equipment is normally removed. The general exhaust therefore does not normally contain acids, caustics or solvents.

In a solvent exhaust system, air containing solvents from the process equipment is removed. The devices utilized in the exhaust system therefore must be explosion-proof for safety reasons. In the scrubbed exhaust system, air containing acids, caustics and other harmful chemicals from the process chamber is removed. Various caustics in the exhaust gases such as ammonia, silane or other toxic gases must be treated by a scrubber before releasing into the atmosphere. A wet scrubber is normally used to remove acids and caustics in a process chamber exhaust by washing the air with a solvent such as water. City water is adequate for such purpose. The waste water from the scrubber is then sent to a neutralization plant in a waste treatment area of the fabrication facility. A dry scrubber can also be used to remove caustics substances from a process chamber exhaust by absorbing the substances into a scrubber material which is typically maintained at an elevated temperature. The scrubber material can then be replaced when it is saturated with the toxic substances.

The various exhaust systems are connected to process machines via ductworks. For instance, when exhausting from a metal etcher, a chemical vapor deposition chamber or a sputter, spent reactant gases and reaction by-products are normally discharged into a scrubbed exhaust system for treatment before the exhaust can be released into the atmosphere. A typical system for treating exhaust gases from a semiconductor process chamber such as an etcher is shown in FIG. 1.

Referring initially to FIG. 1, wherein a semiconductor fabrication system 10 is shown. The fabrication system 10 consists of a process chamber 12, a vent exhaust 14, a main booster pump 16, a dry pump 22, a nitrogen purge gas supply 24 and a wet scrubber 26. Into the process chamber 12, carrier gases and etchant gases (not shown) are first fed into the chamber through various valve openings (not shown). An inert gas such as pure nitrogen is normally used either as a carrier gas for the etchant gases or as a purge gas when venting of the chamber to atmospheric pressure is needed. In a typical metal etching application, etchant gases such as $Cl_2$ and $BCl_3$ are used. In a batch-type metal etcher where a plurality of wafers, i.e., 16 wafers in a column type etcher, are etched in a typical etching process. In order to achieve an effective etching rate for a large number of wafers, a high concentration of etchant gas must be utilized in the process chamber 12. The exhaust gases discharged from the process chamber 12 at the outlet port 18 therefore contains a high concentration of un-spent etchant gases and other etching reaction by-products. The vent exhaust 14 is provided for venting of the pure nitrogen used to purge out the process chamber 12 after an etching reaction. The un-spent etchant gases are discharged out of the process chamber 12 by the main booster pump 16. A dry pump 22 is subsequently used to deliver the un-spent etchant gases into a wet scrubber 26 through an inlet port 20.

The pump exhaust system 30 which includes the main booster pump 16, the dry pump 22 and the dry nitrogen source 24 are controlled by a series of valves (not shown). When the valves between the process chamber 12 and the main booster pump 16 are opened, exhaust gases exit outlet port 18 and pass through the passageway 28 to enter into the main booster pump 16. The main booster pump 16 acts as the front stage pump and the dry pump 22 acts as the back stage pump, which work together to provide a vacuum that is sufficiently high for the process chamber 12 prior to an etching process. The exhaust gases exit the dry pump 22 through passageway 34 and enter the wet scrubber 26 through an inlet port 20. During a normal etching process, chamber 12 is first evacuated by the operation of the main booster pump 16 and the dry pump 22 to a suitable vacuum for conducting the etching process. Etchant gases then enter into the chamber to commence the etching process on the wafers. A suitable chamber pressure is maintained during such etching process.

FIG. 2 is a schematic illustrating a detailed view of the exhaust gas conduit 34 and the wet scrubber 26 shown in FIG. 1. It is seen that exhaust gases 38 delivered from the dry pump 22 enter inlet 42 of the exhaust gas conduit 34. The exhaust gas conduit 34 is normally constructed of stainless steel such that it can be maintained at an elevated temperature of approximately 120° C. by heaters 44 to reduce the potential of particulate depositions in the conduit 34. As the exhaust gases 38 enter the wet scrubber 26 through the inlet port 20, the exhaust gases 38 are washed by a cleaning solvent 48 dispensed from a spray head 50. The cleaning solvent 48 is first supplied from a solvent reservoir (not shown) through conduit 52. A commonly used cleaning solvent for a wet scrubber is city water. After being scrubbed by the cleaning solvent 48, the exhaust gases 38 exit the wet scrubber 26 through an exhaust outlet port 46 into a factory exhaust system (not shown). The spent cleaning solvent 38 is collected by the solvent collection device 54 and then transported through conduit 56 into a spent solvent collection tank 58.

It should be noted that, in the application of a wet scrubber for a metal etcher, the spent water collected in the collection tank 58 is maintained at a pH value between about 6 and about 6.3. In other words, the spent city water is allowed to be slightly acidic after it is used to scrub the exhaust gases. The effectiveness of the wet scrubbing operation is maintained by continuously adding fresh city water to the spent water collection tank 58 and recirculating the water through the scrubbing process as long as the pH value of the spent water is between the values described above.

An illustration of the wet scrubber 26 is also shown in FIG. 3 with the additional components of a water pump 64 and an exhaust fan 66. It should be noted that exhaust gas 38 from a process chamber is normally kept at the same temperature as the clean room temperature of 22±2° C., while the scrubbed exhaust gas 62 after being washed by city water is approximately 19° C., or in the range between about 18° C. and about 20° C. In this conventional set-up, the scrubbed exhaust gas 62, even though containing a high cooling capacity, is directly released into the atmosphere. The cooling capacity of the scrubbed exhaust gas 62, i.e., at 19° C., is therefore completely wasted.

In semiconductor fabrication facilities where clean rooms are widely used, a general exhaust from the clean rooms is normally kept at a low temperature of about 22±2° C. The general exhaust must be continuously released into the atmosphere in order to replenish a fresh air environment in the clean rooms. To maintain the clean room temperature at approximately 22±2° C., the clean room air is supplied by an air conditioning unit that utilizes cooling towers. A heat exchanger in the cooling tower utilizes chilled water for cooling the clean room air that circulates through the cooling tower. An exhaust air which is blown through the cooling elements of the cooling tower carries the heat transferred from the clean room air to the chilled water. The temperature of the exhaust air from the cooling tower is normally in the range between about 36° C. and about 38° C. The exhaust air contains a high moisture level, i.e., between about 80% and about 100% relative humidity, more likely between about 90% and about 100% relative humidity. The high humidity content of the cooling tower exhaust air comes from the cooling water that is sprayed on the cooling elements in the tower. The high water content results in wasted consumption of process water in the cooling tower. It is therefore desirable if the moisture content in the cooling tower exhaust gas can be reduced by reducing the temperature of the exhaust air.

In recent years, the minimization of the environment impact by a factory exhaust air has been enforced by various environmental protection agencies. For instance, the opacity of an exhaust air from a manufacturing plant is normally regulated at less than 20%. Since the opacity of the exhaust air is directly related to its temperature and its humidity content, it is desirable not to release exhaust air into the atmosphere which has a temperature lower than 19° C., i.e., such as the exhaust air from a wet scrubber.

It is therefore an object of the present invention to provide a system for recovering energy from a factory exhaust gas that does not have the drawbacks or shortcomings of conventional systems.

It is another object of the present invention to provide a system for recovering energy from a factory exhaust gas by utilizing the cooling capacity of a wet scrubber exhaust gas.

It is a further object of the present invention to provide a system for recovering energy from a factory exhaust gas by utilizing the cooling capacity of a wet scrubber exhaust gas and a heat exchanger for cooling a heat transfer medium used in a cooling tower.

It is another further object of the present invention to provide a system for recovering energy from a factory exhaust gas by utilizing a heat exchanger to raise a low temperature wet scrubber exhaust gas to a higher temperature exhaust gas and to reduce the opacity simultaneously.

It is still another object of the present invention to provide a system for recovering energy from a factory exhaust gas by transferring thermal energy from a 38° C. cooling tower exhaust gas to a 19° C. wet scrubber exhaust gas such that the efficiency of the cooling tower can be improved and the water consumption can be reduced.

It is yet another object of the present invention to provide a system for recovering energy from a factory exhaust gas by recovering cooling capacity from a wet scrubber exhaust gas for converting to use in a water chiller for an air conditioning system.

It is still another further object of the present invention to provide a method for recovering energy from a factory exhaust gas by connecting a heat exchanger between a wet scrubber and a chilled water cooling tower such that the cooling tower water temperature can be reduced by utilizing the cooling capacity in the scrubber exhaust gas.

It is yet another further object of the present invention to provide a method for recovering energy from a factory exhaust gas by transferring heat from a cooling tower water to a wet scrubber exhaust gas such that temperature of the latter is increased by at least 5° C. and the opacity of the scrubber exhaust gas is reduced to less than 20%.

SUMMARY OF THE INVENTION

In accordance with the present invention, a system and a method for recovering cooling capacity from a factory exhaust gas, and specifically from a low temperature scrubber exhaust gas utilizing a heat exchanger are disclosed.

In a preferred embodiment, a system for recovering energy from a factory exhaust gas can be provided which includes a scrubber that has an inlet for receiving an exhaust gas from a process chamber and an outlet for outputting scrubbed exhaust gas at a first temperature, a chiller in fluid communication with a cooling tower through a first and a second conduit, the chiller further includes a third conduit for outputting a heat transfer medium at a third temperature to a heat exchanger and a fourth conduit for inputting the heat transfer medium at a fourth temperature from the heat exchanger, the fourth temperature is generally lower than the third temperature, and a heat exchanger for receiving the scrubbed exhaust gas at the first temperature and outputting a heated, scrubbed exhaust gas at a second temperature at least 5° C. higher than the first temperature by absorbing thermal energy from the heat transfer medium of the chiller.

In the system for recovering energy from a factory exhaust gas, the heated scrubbed exhaust gas outputted from the heat exchanger may be flown into a factory exhaust pipe for releasing into the atmosphere. The first temperature of the outputted scrubbed exhaust gas may be between about 18° C. and about 22° C. The second temperature of the heated scrubbed exhaust gas may be at least 8° C. higher than the first temperature. The second temperature of the heated scrubbed exhaust gas may be at least 28° C.

In the system, the fourth temperature may be at least 5° C. lower than the third temperature. The chiller may further include an input of chilled water at about 10° C. and an output of chilled water at about 5° C. The output of chilled water from the chiller may be fed to an air conditioning system. The first conduit transport a heat transfer medium from the cooling tower to the chiller, while the second conduit transport the heat transfer medium from the chiller back to the cooling tower.

In the system, the heat transfer medium transported in the first conduit may be at least 5° C. lower in temperature than the heat transfer medium transported in the second conduit. The heat transfer medium transported in the first conduit may be between about 30° C. and about 32° C., while the heat transfer medium transported in the second conduit may be between about 36° C. and about 38° C. The heat transfer medium transported in the third conduit may be at least 5° C. higher than the heat transfer medium transported in the fourth conduit. The heat transfer medium transported in the third conduit may be between about 36° C. and about 40° C., while the heat transfer medium transported in the fourth conduit may be between about 26° C. and about 30° C.

The present invention is further directed to a method for recovering energy from factory exhaust gas which can be carried out by the steps of first providing a scrubber that has a gas inlet and a gas outlet, then flowing an exhaust gas from a process chamber into a gas inlet of the scrubber, flowing a scrubbed exhaust gas at a first temperature not higher than 22° C. from the gas outlet of the scrubber into a heat exchanger, providing a chiller in fluid communication with the first conduit and the second conduit, flowing a heat transfer medium at a third temperature to the heat exchanger through a third conduit from the cooling tower, flowing a heat transfer medium at a fourth temperature lower than the third temperature to the cooling tower through a fourth conduit from the heat exchanger, flowing a heated scrubbed gas at a second temperature at least 5° C. higher than the first temperature into a factory exhaust pipe for releasing into the atmosphere.

In the method for recovering energy from a factory exhaust gas, the heat transfer medium utilized may be water. The first temperature of the scrubbed exhaust gas may be between about 18° C. and about 22° C. The energy recovery is accomplished by the heat transfer occurred from the heat transfer medium kept at the third temperature to the scrubbed exhaust gas kept at the first temperature. The second temperature of the heated, scrubbed exhaust gas may be at least 8° C. higher than the first temperature, or the second temperature of the heated, scrubbed exhaust gas may be at least 28° C. The fourth temperature may be at least 5° C. lower than the third temperature. The condenser may further include an input of chilled water at about 10° C. and an output of chilled water at about 5° C.

In the method, the output of chilled water from the chiller may be fed to an air conditioning system used for cooling clean room air. The first conduit transports a heat transfer medium from the cooling tower to the chiller, while the second conduit transports a heat transfer medium from the chiller to the cooling tower. The heat transfer medium transported in the first conduit may be at least 5° C. lower in temperature than the heat transfer medium transported in the second conduit. The same temperature difference may exist in the third conduit and in the fourth conduit. The heat transfer medium transported in the first conduit may be between about 30° C. and about 32° C., while the heat transfer medium transported in the second conduit may be between about 36° C. and about 38° C. The same temperature ranges may exist in the third conduit and in the fourth conduit, respectively.

BRIEF DESCRIPTION OF THE DRAWINGS

These and other objects, features and advantages of the present invention will become apparent from the following detailed description and the appended drawings in which.

DETAILED DESCRIPTION OF THE PREFERRED EMBODIMENT

The present invention discloses a system and a method for recovering energy from a low temperature factory exhaust gas, and particularly, an exhaust gas from a wet scrubber chamber. In the present invention system for recovering energy from a low temperature wet scrubber chamber, a wet scrubber chamber is first provided which includes an inlet for receiving an exhaust gas from a process chamber, i.e., an etcher, and an outlet for outputting scrubbed exhaust gas at a low temperature in the range between about 18° C. and about 20° C. The system further includes a chiller that is in fluid communication with a cooling tower through a first conduit and a second conduit. The cooling tower includes a third conduit for outputting a heat transfer medium such as water at a third temperature to a heat exchanger and a fourth conduit for inputting the heat transfer medium, i.e., water at a fourth temperature from the heat exchanger. The fourth temperature is normally lower than the third temperature by at least 5° C., and preferably by at least 8° C.

The system further includes a heat exchanger that is installed between the wet scrubber and the cooling tower for receiving the scrubbed exhaust gas at the first temperature and outputting a heated scrubbed exhaust gas at a second temperature. The second temperature is at least 5° C. higher, and preferably at least 8° C. higher than the first temperature by absorbing thermal energy from the heat transfer medium of the cooling tower. The heated, scrubbed exhaust gas may exit the heat exchanger at a temperature of at least 28° C. such that the opacity of the original scrubber exhaust gas at about 19° C. is substantially reduced. Under the guidelines of the environmental protection regulation, an opacity of less than 20% should be maintained in factory exhaust air.

The heated, scrubbed exhaust gas outputted from the heat exchanger may be flown into a factory exhaust pipe for releasing into the atmosphere. A suitable first temperature for the outputted scrubbed exhaust gas may be between about 18° C. and about 22° C., while the second temperature of the heated, scrubbed exhaust gas suitable for releasing to the atmosphere may be at least 8° C. higher than the first temperature, for instance, may be at least 28° C. The chiller may have an input of chilled water at about 10° C. and an output of chilled water at about 5° C. The output of chilled water from the chiller may be fed to an air conditioning system for supplying air conditioned clean room air.

In the system, the first conduit may transport a heat transfer medium at a temperature of at least 5° C. lower than the heat transfer medium in the second conduit. The temperature of the heat transfer medium in the first conduit may be between about 30° C. and about 32° C., while the temperature for the heat transfer medium in the second conduit may be between about 36° C. and about 38° C.

Figure 1:
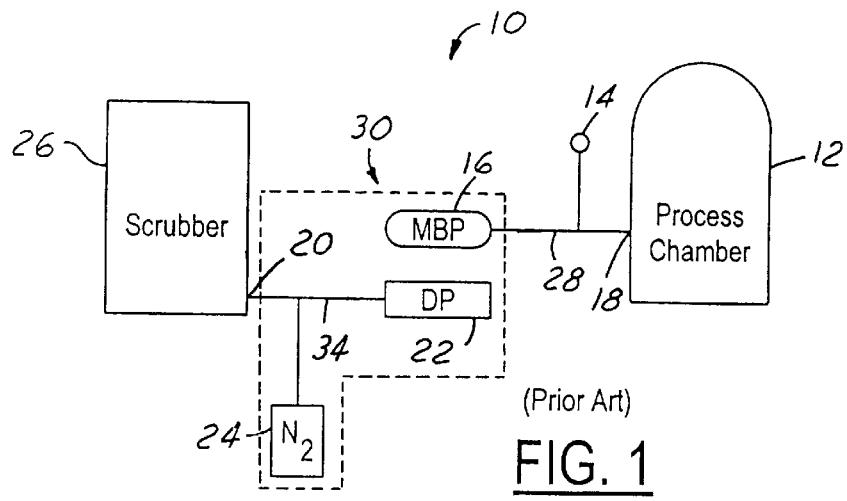
FIG. 1 is a schematic illustrating a conventional semiconductor fabrication system including a process chamber, a main booster pump, a dry pump and a wet scrubber.
Figure 2:
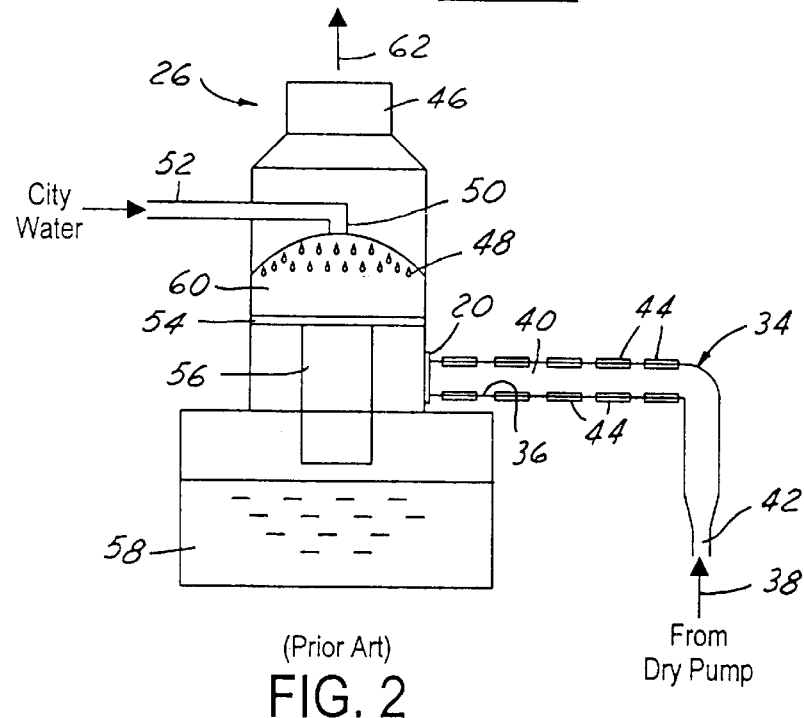
FIG. 2 is a schematic illustrating the exhaust gas conduit and the wet scrubber of FIG. 1.
Figure 3:
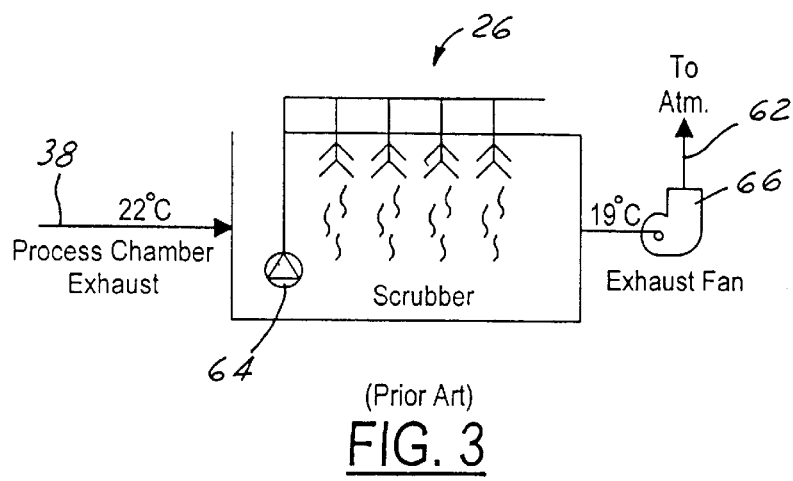
FIG. 3 is a schematic illustrating the wet scrubber with the additional components of a water pump and an exhaust fan.
Figure 4:
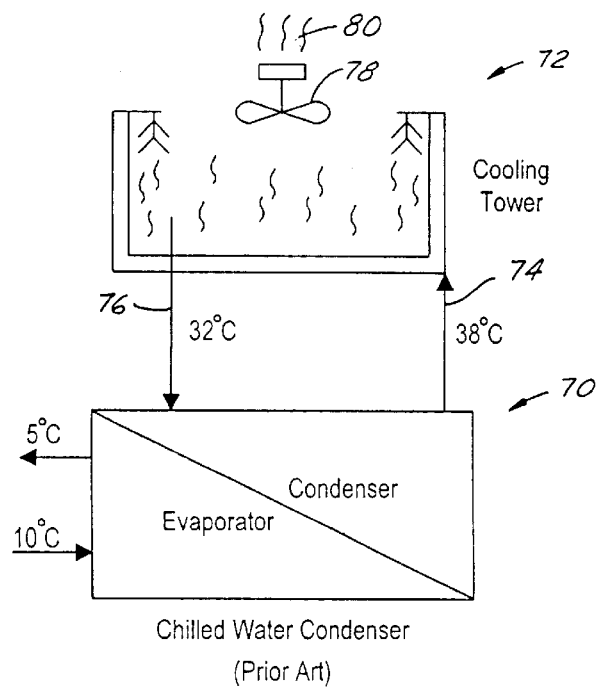
FIG. 4 is a schematic illustrating a conventional set up of a water cooling tower for a chilled water condenser.

A conventional set up of a chiller 70 consisting of an evaporator/condenser in combination with a cooling tower 72 is shown in FIG. 4. It is seen that the chiller accepts a chilled water input at 10° C. and outputting a chilled water at 5° C. for use in an air conditioning system. The heat transfer process from the input chilled water is accomplished by the cooling tower 72 and by the heat exchanger 100. For instance, the cooling tower 72 accepts a high temperature heat transfer medium 74, i.e., at approximately 38° C. or in a range between about 36° C. and about 40° C., and outputs a heat transfer medium 76 that is at least 5° C. lower in temperature. The heat carried by the heat transfer medium 74 is dissipated by the exhaust fan 78 and the hot air 80 which is normally saturated with 95% relative humidity. The humidity content of the exhaust air 80 is high due to the high temperatures of the exhaust air and the heat transfer medium 74. At such high humidity content, water evaporation loss of the cooling tower is severe resulting in a large waste of process water. The present invention novel apparatus and method therefore allows the temperature of a heat transfer medium in a cooling tower to be reduced and thus reducing the temperature of the exhaust air 80 and the moisture content of the exhaust air 80 resulting in decreased evaporation loss of the process water.

The present invention further discloses a method for recovering cooling capacity from a low temperature factory exhaust gas by first providing a wet scrubber which is equipped with a gas inlet and a gas outlet, then flowing an exhaust gas from a process chamber such as an etcher into the gas inlet of the scrubber, flowing a scrubbed exhaust gas at a temperature not higher than 22° C. from the gas outlet of the scrubber into a heat exchanger, then providing a chiller that is in fluid communication with a cooling tower through a first conduit and a second conduit, flowing a heat transfer medium at a third temperature to the heat exchanger through a third conduit from the chiller, and flowing the heat transfer medium at a fourth temperature lower than the third temperature to the chiller through a fourth conduit from the heat exchanger, and then flowing a heated, scrubbed exhaust gas at a second temperature that is at least 5° C. higher than the first temperature into a factory exhaust pipe for releasing into the atmosphere.

Figure 5:
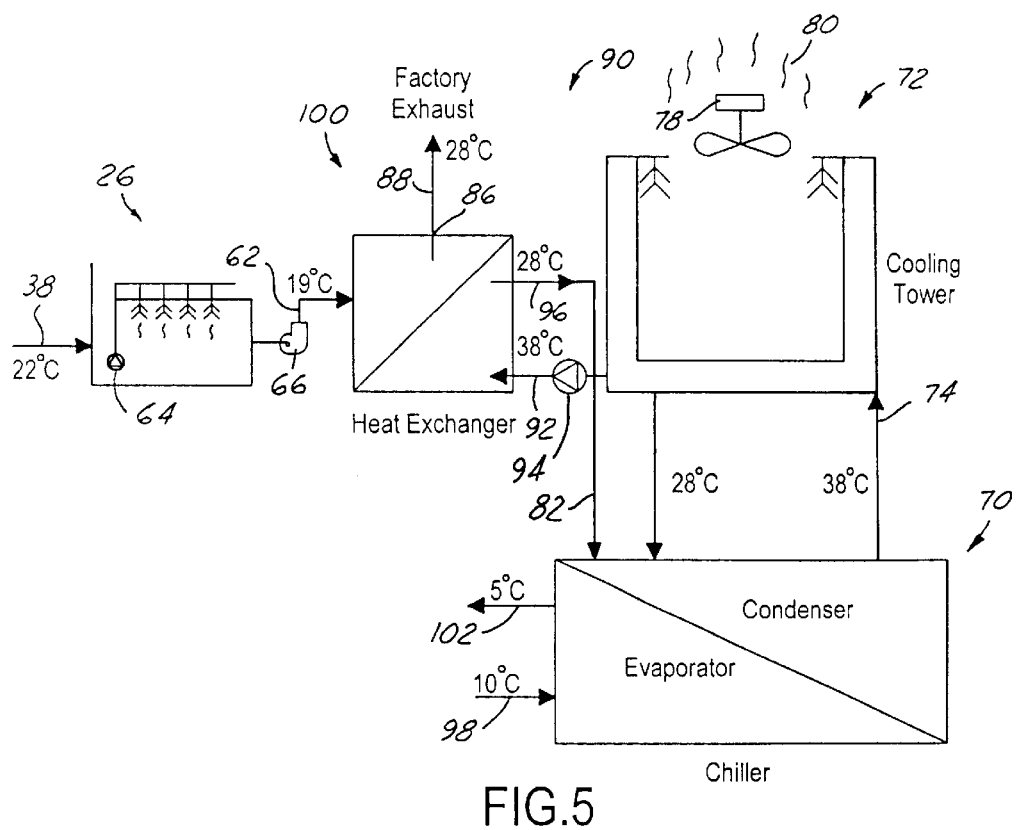
FIG. 5 is a schematic illustrating the present invention novel system utilizing a heat exchanger between a wet scrubber exhaust gas and a cooling tower heat transfer medium.

Referring now to FIG. 5 wherein a present invention novel system 90 for recovering energy from a low temperature factory exhaust gas is shown. In the system 90, a heat exchanger 100 is installed between the wet scrubber 26 and the water cooling tower 72. A chiller or an evaporator/condenser 70 is connected to the cooling tower 72 for producing a chilled water supply for an air conditioning system (not shown).

The heat exchanger 100 is equipped with an inlet port 84 for accepting an input exhaust gas 62 from a wet scrubber 26, and an output port 86 for outputting an exhaust gas 88 into a factory exhaust system for releasing into the atmosphere. It is seen that, as previously eluded, a low temperature exhaust gas at approximately 19° C. or in the range between about 18° C. and about 20° C. is fed into the input port 84 of the heat exchanger 100. Simultaneously, a heat transfer medium 92 is fed from the cooling tower 72 by pump 94 into heat transfer elements (not shown) in the heat exchanger 100. After releasing heat to the scrubber exhaust gas 62, the heat transfer medium 96 exits the heat exchanger 100 at a significantly lower temperature than the inputted heat transfer medium 92. For instance, as shown in FIG. 5, the inputted heat transfer medium 92 is at a high temperature of 38° C., while the outputted heat transfer medium 96 is at a significantly reduced temperature of 28° C. It has been noted that at least a 5° C., and preferably at least an 8° C. temperature drop is desirable. The reduced temperature heat transfer medium 96 is then fed back into the chiller 70 for removing heat from the incoming heat transfer medium 98 to enable a further chilled output 102 to be supplied to an air conditioning system. When compared to the conventional set up shown in FIG. 4, the temperature of the heat transfer medium 82 is lower than the heat transfer medium 76 shown in FIG. 4. A heated, scrubbed exhaust gas 88 is thus outputted from the output port 86 into a factory exhaust pipe for releasing to the atmosphere. The temperature of the heated, scrubbed exhaust gas is at least 5° C., and preferably at least 8° C. higher than the original scrubber exhaust gas 62. As illustrated in FIG. 5, a 9° C. increase has been achieved in the present invention novel heat exchanger arrangement. The higher temperature, i.e., 28° C. exhaust gas 88 provides the additional benefit of the present invention novel system, i.e., a lower opacity value that meets the environmental protection regulations.

Several major benefits are achieved by the present invention novel method and system. First, by recovering energy, or recovering the cooling capacity of the low temperature scrubber exhaust gas in a heat exchanger, a heat transfer process between a 38° C. heat transfer medium and a 19° C. scrubber exhaust gas can be accomplished. The cooling capacity of the low temperature scrubber exhaust gas is used to cool the heat transfer medium for the cooling tower from approximately 38° C. to approximately 28° C. The chiller efficiency is therefore improved. It has been shown that for each 1° C. drop in the consumption of the chiller, the efficiency of the chiller or the condenser can be increased by 1.5%. In the present invention system, when the temperature of the condenser has dropped by approximately 6° C., i.e., from 38° C. to 32° C., a saving of 68 KW in energy consumption is realized. This is based on a total energy consumption of the condenser at 681 KW. Secondly, based on the temperature drop in the condenser, the water evaporation loss in the cooling tower is significantly reduced. In the present invention system, a water saving of 484 tons/month/machine has been realized. Thirdly, the opacity of the exhaust gas has decreased by approximately 2% due to the increase in the exhaust gas temperature. The opacity value is well within the 20% limit imposed by the environmental protection agency.

The present invention novel method and system have therefore been amply demonstrated in the above descriptions and in the appended drawing of FIG. 5. The lower water temperature, or the lower heat transfer medium temperature in the cooling tower further reduces the turn-on time required of the fan blower and thus further achieves energy savings in electric power.

While the present invention has been described in an illustrative manner, it should be understood that the terminology used is intended to be in a nature of words of description rather than of limitation.

Furthermore, while the present invention has been described in terms of a preferred and an alternate embodiment, it is to be appreciated that those skilled in the art will readily apply these teachings to other possible variations of the inventions.

The embodiment of the invention in which an exclusive property or privilege is claimed are defined as follows:

What is claimed is:

1. A system for recovering cooling capacity from a factory exhaust gas comprising:
    a scrubber having an inlet for receiving an exhaust gas from a process chamber and an outlet for outputting scrubbed exhaust gas at a first temperature, said first temperature not higher than about 22° C.,
    a heat exchanger for receiving said scrubbed exhaust gas at said first temperature and outputting a heated, scrubbed exhaust gas at a second temperature at least 5° C. higher than said first temperature by absorbing thermal energy from said heat transfer medium of said cooling tower,
    a cooling tower, and
    a condenser in fluid communication with said cooling tower through a first and a second conduit, said cooling tower further comprises a third conduit for outputting a heat transfer medium at a third temperature to a heat exchanger and a fourth conduit for inputting said heat transfer medium at a fourth temperature from said heat exchanger, said fourth temperature being generally lower than said third temperature.

2. A system for recovering energy from a factory exhaust gas according to claim 1, wherein said heated, scrubbed exhaust gas outputted from said heat exchanger is flown into a factory exhaust pipe for releasing into the atmosphere.

3. A system for recovering energy from a factory exhaust gas according to claim 1, wherein said first temperature of said outputted scrubbed exhaust gas is between about 18° C. and about 22° C.

4. A system for recovering energy from a factory exhaust gas according to claim 1, wherein said second temperature of said heated, scrubbed exhaust gas is preferably at least 8° C. higher than said first temperature.

5. A system for recovering energy from a factory exhaust gas according to claim 1, wherein said second temperature of said heated, scrubbed exhaust gas is at least 28° C.

6. A system for recovering energy from a factory exhaust gas according to claim 1, wherein said fourth temperature being at least 5° C. lower than said third temperature.

7. A system for recovering energy from a factory exhaust gas according to claim 1, wherein said chiller further comprises an input of chilled water at about 10° C. and an output of chilled water at about 5° C.

8. A system for recovering energy from a factory exhaust gas according to claim 1, wherein said output of chilled water from said chiller is fed to an air conditioning system.

9. A system for recovering energy from a factory exhaust gas according to claim 1, wherein said first conduit transport a heat transfer medium from said cooling tower to said chiller, while said second conduit transports a heat transfer medium from said chiller to said cooling tower.

10. A system for recovering energy from a factory exhaust gas according to claim 1, wherein said heat transfer medium transported in said first conduit is at least 5° C. lower in temperature than said heat transfer medium transported in said second conduit.

11. A system for recovering energy from a factory exhaust gas according to claim 1, wherein said heat transfer medium transported in said first conduit is between about 30° C. and about 32° C., while said heat transfer medium transported in said second conduit is between about 36° C. and about 38° C.

12. A system for recovering energy from a factory exhaust gas according to claim 1, wherein said heat transfer medium transported in said third conduit is at least 5° C. higher than said heat transfer medium transported in said fourth conduit.

13. A system for recovering energy from a factory exhaust gas according to claim 1, wherein said heat transfer medium transported in said third conduit is between about 36° C. and about 40° C., while said heat transfer medium transported in said fourth conduit is between about 26° C. and about 30° C.

14. A method for recovering energy from a factory exhaust gas comprising the steps of:
    providing a scrubber having a gas inlet and a gas outlet,
    flowing an exhaust gas from a process chamber into said gas inlet of said scrubber,
    flowing a scrubbed exhaust gas at a first temperature not higher than 22° C. from said gas outlet of said scrubber into a heat exchanger,
    providing a condenser in fluid communication with a cooling tower through a first conduit and a second conduit,
    flowing a heat transfer medium at a third temperature to said heat exchanger through a third conduit from said cooling tower,
    flowing a heat transfer medium at a fourth temperature lower than said third temperature to said cooling tower through a fourth conduit from said heat exchanger, and,
    flowing a heated, scrubbed exhaust gas at a second temperature at least 5° C. higher than said first temperature into a factory exhaust pipe for releasing into the atmosphere.

15. A method for recovering energy from a factory exhaust gas according to claim 14, wherein said heat transfer medium is water.

16. A method for recovering energy from a factory exhaust gas according to claim 14, wherein said first temperature of said scrubbed exhaust gas is between about 18° C. and about 22° C.

17. A method for recovering energy from a factory exhaust gas according to claim 14, wherein said energy recovery being accomplished by heat transfer from said heat transfer medium at said third temperature to said scrubbed exhaust gas at said first temperature.

18. A method for recovering energy from a factory exhaust gas according to claim 14, wherein said second temperature of said heated, scrubbed exhaust gas is preferably at least 8° C. higher than said first temperature.

19. A method for recovering energy from a factory exhaust gas according to claim 14, wherein said second temperature of said heated, scrubbed exhaust gas is at least 28° C.

20. A method for recovering energy from a factory exhaust gas according to claim 14, wherein said fourth temperature is at least 5° C. lower than said third temperature.

21. A method for recovering energy from a factory exhaust gas according to claim 14, wherein said condenser further comprises an input of chilled water at about 10° C. and an output of chilled water at about 5° C.

22. A method for recovering energy from a factory exhaust gas according to claim 14, wherein said output of chilled water from said condenser is fed to an air conditioning system.

23. A method for recovering energy from a factory exhaust gas according to claim 14, wherein said first conduit transport a heat transfer medium from said cooling tower to said condenser, while said second conduit transports a heat transfer medium from said condenser to said cooling tower.

24. A method for recovering energy from a factory exhaust gas according to claim 14, wherein said heat transfer medium transported in said first conduit is at least 5° C. lower in temperature than said heat transfer medium transported in said second conduit.

25. A method for recovering energy from factory exhaust gas according to claim 14, wherein said heat transfer medium transported in said first conduit is between about 30° C. and about 32° C., while said heat transfer medium transported in said second conduit is between about 36° C. and about 38° C.

26. A method for recovering energy from factory exhaust gas according to claim 14, wherein said heat transfer medium transported in said third conduit is at least 5° C. higher than said heat transfer medium transported in said fourth conduit.

27. A method for recovering energy from factory exhaust gas according to claim 14, wherein said heat transfer medium transported in said third conduit is between about 36° C. and about 40° C., while said heat transfer medium transported in said fourth conduit is between about 26° C. and about 30° C.

* * * * *